S. PERRY.
TREAD HORSE POWER.
No. 35,062. Patented Apr. 22, 1862.
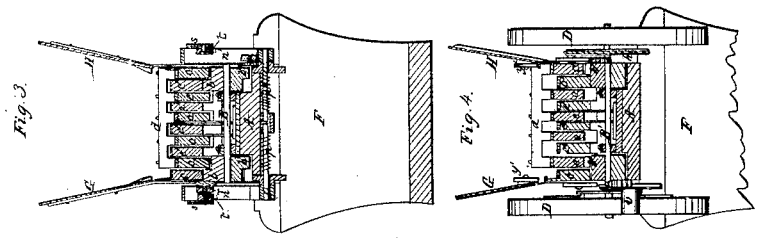
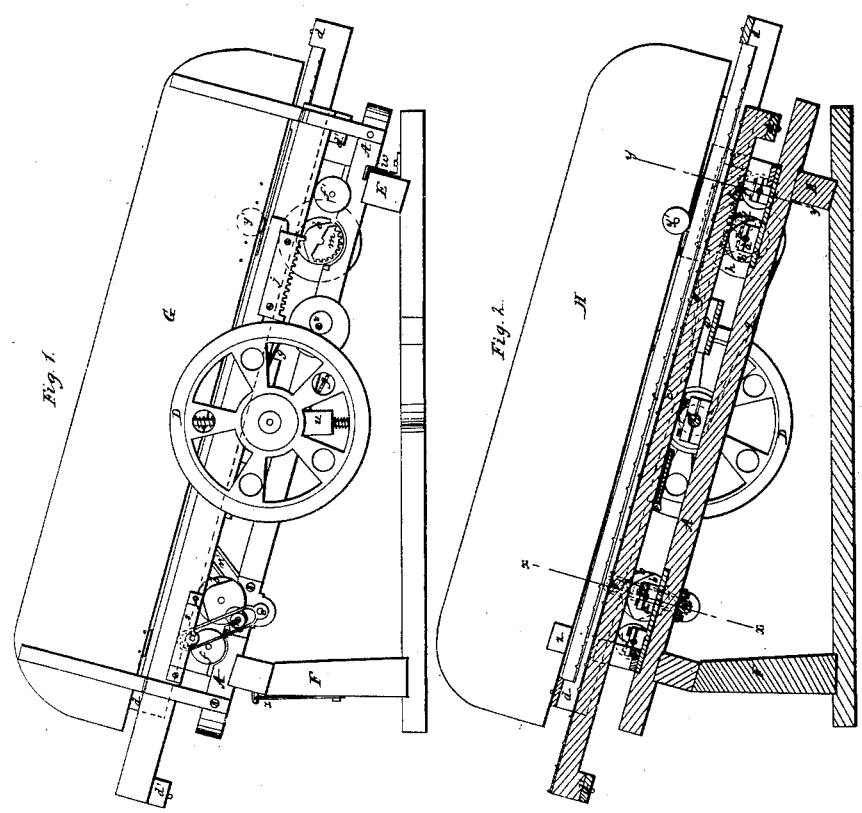
Witnesses:
Inventor:

UNITED STATES PATENT OFFICE.

STUART PERRY, OF NEWPORT, NEW YORK, ASSIGNOR TO CHARLES H. A. CARTER, OF NEW YORK, N. Y.

TREAD HORSE-POWER.

Specification of Letters Patent No. 35,062, dated April 22, 1862.

*To all whom it may concern:*

Be it known that I, STUART PERRY, of Newport, in the county of Herkimer and State of New York, have invented certain new and useful Improvements in Tread Horse-Powers, and that the following is a full, clear, and exact description of the same, reference being had to the accompanying drawings, making a part of this specification, in which—

Figure 1, represents a view taken from one of the sides of the horse power machine. Fig. 2, represents a central, longitudinal and vertical section through the same. Fig. 3, represents a transverse vertical section taken at the red line $x$, $x$, of Fig. 2, and Fig. 4, represents a similar transverse section, taken at the red line $y$, $y$, of Fig. 2.

Similar letters of reference where they occur in the separate figures, denote like parts of the horse power machine in all cases.

My invention consists in using, in connection with what are known as tread or treadle horse-powers, two or more interlaced treadles or treadle frames, one of which shall be acting, while the other is returning to take its place, and so on alternating under the feet of the horse or horses as they walk upon these interlaced treadles, and thus producing a motion that may by any of the common well known modes, be transmitted to any machinery which is to be driven by it.

To enable others skilled in the art to make and use my invention, I will proceed to describe the same with reference to the drawings.

A, represents a base or frame on which the horse power is supported. In suitable bearings $a$, on this base, and at or near the ends thereof, are arranged the shafts B, B′, which have upon them cams or eccentrics $b$, $b'$, for alternately raising and lowering the interlaced treadles, or treadle frames $c$, $c'$, upon which the horse or other animal walks or treads. The series of treadles $c$, are united at their ends by a cross piece $d$, and the other series ($c'$), by cross pieces $d'$; and intermediate cross pieces $e$, $e'$, may also be used between the end pieces, and so arranged that they may afford both a vertical and lateral support to each other, thus making the treadles sufficiently strong, without being very heavy. There are also friction rollers $f$, $f'$, near the ends of the base A, to support these treadles, and allow them to move freely as they are being rolled back to be again raised up by the segmental wheels. The treadles $c$, $c'$, beside their motion longitudinally which is derived from the walking of the horse upon them, in one direction, and carried back by its fellow, when the horse is walking upon that one, have a vertical motion given to them by the cams or eccentrics $b$, $b'$, alternately—that is to say when one of the treadles or treadle frames has reached its extreme rear traverse, it is gently let down by the cams on the shafts B, B′, and removed from contact with the feet of the horse or horses, after the other treadle or treadle frame has been gently raised up so as to receive the tread of the horse or horses. And the treadle thus lowered is carried forward below the plane of the acting treadle, and in turn becomes the active treadle, when its fellow has been depressed. Thus the walking of the horse or horses upon alternating, or reciprocating interlaced treadles, is caused to produce a continuous rotating motion to the shafts B, B′, and from this shaft B′ the motion may be communicated to the shaft C, carrying the fly or balance wheel or wheels D, by a belt and pulleys $g$, $h$, $i$, or by any other known ways, and from this shaft C, or from the balance wheel or wheels D, to any machinery to be driven by it.

On one of the treadles ($c'$) there is a toothed rack $j$ (Fig. 1) and upon the other treadle ($c$) there is a similar toothed rack $k$ (Fig. 2); and upon the shaft B′ there are two segmental cog arcs or wheels $l$, $m$, which are alternately acted upon by their respective racks, each turning the shaft B′, a half revolution, and then running out of gear, while the opposite rack and toothed arc, running into action just as the other runs out, continues the rotation of said shaft B′, in the same direction. This motion may be produced by ratchets and spring pawls, and for light horse powers the ratchets and pawls may be substituted. The toothed segments and racks however, for heavy work are the most reliable.

The rear ends of the treadles, are raised up and let down alternately, as they go into, or out of active propulsion. The front ends must at exactly the same time be correspondingly raised up and let down. To accomplish this, I arrange as follows: The cams

*b*, *b'*, on the shaft B, raise up and let down the treadles at proper times, but each treadle after having gone to the extent of its traverse rearward must be returned again for the next traverse, and I do this by means of slotted arms *n*, *n'* attached to shafts *o*, *o'* (Fig. 3), around which shafts there are coiled springs *p*, *p'*, which wind up around the shaft, as its special treadle moves rearward under the power of the horse or horses, and when this treadle is released from the pressure of the horse or horses, as it is at the end of its traverse, the recoil of its spring, together with the action of the cams *b*, *b'*, carries back the treadles alternately, to be acted upon again by the treading of the horse or horses.

On the ends of the cam shaft B, there are friction wrist pins or rollers *r*, which are placed diametrically opposite to each other, which gives to each its best working position, with regard to the other, and these friction rollers *r*, work in the slotted arms *n*, *n'*, as seen in the drawings. On the treadles respectively, are attached pillar blocks or supports *s*, in which are hung friction wheels *t*, which also work in the respective slotted arms *n*, *n'*; and by these devices and connections the treadles are raised up and let down vertically, and carried forward longitudinally to return them into the proper position for being alternately tread upon by the horse or horses.

I have herein shown a centrifugal, power regulator *u*, as applied through a brake block or roller *v*, to the balance wheel of the horse power. But as I have made a separate application for Letters Patent for this power and speed regulator, a further description of it here is not deemed necessary.

Although I have represented my horse power as mounted upon blocks E, F, and secured thereto by braces *w*, and a clasp or hook *x'*, yet I may arrange it in any other way—the above means of supporting it shows a simple and convenient mode, and the horse power is easily mounted upon them. The balance wheels D it will be observed, are placed about centrally of the machine and when the horse power is let down upon the ground, these wheels, become supporting and carrying wheels upon which the horse power may be readily moved from place to place as it is nearly if not exactly balanced upon them.

Friction wheels *y'*, may be placed on the side pieces G, H, or cleats *z*, or both, to prevent the treadles from rising too high, or too suddenly—these devices tending to make them traverse freely and smoothly, and without any sudden jar or noise.

I have shown the treadles as being in one piece lengthwise. They are not necessarily so, for they may be made in sections, so that the horse or horses may travel on one section with their fore or front feet, and on a different section with their "hind" feet, without raising or lowering them at all and still produce the same effect. That the ordinary shoes worn by horses may not interfere with the free motions of the treadles, or unnecessarily cut or wear them out, I propose to use, a removable clog or flat piece of wood, rubber or any other sufficiently durable and yielding material that may be easily clamped to, or removed from their feet, and that will be broad enough to find a firm support upon at least two slats of the same treadle frame. And the slats of the treadles or treadle frames may be covered, and roughened in any suitable manner to resist wearing away, and to prevent the horse's feet from slipping. These clogs are very useful and valuable in any horse power, but particularly so in this special horse power. I am advised, however, that this clog, would not be the proper subject matter of a claim in connection with this application, but I reserve the right to make application for a patent for it, at some future time.

The balance wheel shaft may be rotated, by racks on the treadles, which may work into toothed segments on said shaft, substantially as the shaft B', is rotated.

Besides the duty of returning the treadles, at their lowest plane, the links *n*, *n'*, and their dependent parts prevent the throw, or destroy gently the momentum of the treadles at the ends of their movements after the manner of a crank—they also turn the segmental wheels B, B', when the friction of the treadle with the horse or horses upon it might not do so, and prevent the treadle while rolling on such wheel from slipping. They govern the motions of both treadles, so that when they are at the same height they have identically the same movement and so control the movement of each treadle at its highest plane as to make that movement perfectly uniform.

When sectional treadles are used as above mentioned neither one of the sections or slats can be pressed by more than one of the horse's feet at the same time, and it is returned by a spring or weight when the horse raises the foot that pressed upon it—they are not raised or lowered like the treadles or treadle frames above mentioned.

Having thus fully described the nature and object of my invention, and shown how it may be practically carried out and applied, what I claim is—

1. The use of two or more interlaced reciprocating treadles, to be operated upon by a horse or horses, for the purpose of making a horse power machine, substantially such as described.

2. I also claim in combination with two or more reciprocating interlaced treadles, the cams underneath them for bringing them alternately into contact with, and lowering them away from, the feet of the horses, substantially as described.

3. I also claim in combination with two or more treadles acted upon alternately by the feet of the horse or horses, the racks, and segmental gears for producing a continuous rotary motion out of the alternate reciprocating motion of said treadles substantially as described.

4. I also claim returning each of the treadles after it has completed its working traverse, to its normal working position by means of the mechanism herein described and represented or its substantial equivalent.

STUART PERRY.

Witnesses:
G. D. Rogers,
Wm. H. Chapman.